(12) United States Patent
Earman

(10) Patent No.: US 8,907,264 B2
(45) Date of Patent: Dec. 9, 2014

(54) MOTION AND SIMPLE GESTURE DETECTION USING MULTIPLE PHOTODETECTOR SEGMENTS

(75) Inventor: Allen M. Earman, Santa Clara, CA (US)

(73) Assignee: Intersil Americas LLC, Milpitas, CA (US)

( * ) Notice: Subject to any disclaimer, the term of this patent is extended or adjusted under 35 U.S.C. 154(b) by 309 days.

(21) Appl. No.: 13/523,777

(22) Filed: Jun. 14, 2012

(65) Prior Publication Data

US 2013/0334398 A1  Dec. 19, 2013

(51) Int. Cl.
*G06M 7/00* (2006.01)
(52) U.S. Cl.
USPC ............................................... 250/221
(58) Field of Classification Search
USPC .......................................... 250/221; 348/175
See application file for complete search history.

(56) References Cited

U.S. PATENT DOCUMENTS

| | | | | |
|---|---|---|---|---|
| 3,591,292 | A * | 7/1971 | Feuchter et al. | 356/141.5 |
| 5,410,376 | A * | 4/1995 | Cornsweet et al. | 351/210 |
| 6,702,809 | B1 * | 3/2004 | Knopp et al. | 606/10 |
| 8,086,971 | B2 | 12/2011 | Radivojevic et al. | |
| 2004/0247279 | A1 * | 12/2004 | Platt | 386/12 |
| 2007/0040108 | A1 * | 2/2007 | Wenstrand | 250/221 |
| 2008/0256494 | A1 | 10/2008 | Greenfield | |
| 2009/0050793 | A1 * | 2/2009 | Asano et al. | 250/221 |
| 2009/0122007 | A1 * | 5/2009 | Tsuzaki et al. | 345/156 |
| 2010/0150399 | A1 | 6/2010 | Svajda et al. | |
| 2010/0283730 | A1 * | 11/2010 | Miyazaki | 345/158 |
| 2010/0295773 | A1 | 11/2010 | Alameh et al. | |
| 2011/0176069 | A1 | 7/2011 | Chamberlin et al. | |
| 2012/0280904 | A1 | 11/2012 | Skurnik et al. | |

OTHER PUBLICATIONS

Wang et al., "An Angle-Sensitive CMOS Imager for Single-Sensor 3D Photography," ISSCC 2011 / Session 23 / Image Sensors / 23.7, IEEE International Solid-State Circuits Conference (2011), pp. 412-414.

* cited by examiner

*Primary Examiner* — Thanh Luu
*Assistant Examiner* — Renee D Chavez
(74) *Attorney, Agent, or Firm* — Vierra Magen Marcus LLP

(57) ABSTRACT

An optoelectronics apparatus selectively drives a light source, and includes four electrically isolated photodetector (PD) segments that detect light that has reflected off an object. Each of the four PD segments produces a corresponding signal, referred to as signals A, B, C and D, indicative of the light detected by the respective PD segment. Circuitry is used to produce a first motion signal indicative of a sum of the signals A plus B minus a sum of the signals C plus D, i.e., the first motion signal is indicative of (A+B)−(C+D). Further circuitry produces a second motion signal indicative of (B+C)−(A+D). Additional circuitry produces a signal and/or data that is indicative of a direction and/or rate of motion of an object, in dependence on the first and second motion signals.

23 Claims, 11 Drawing Sheets

US 8,907,264 B2

MOTION AND SIMPLE GESTURE DETECTION USING MULTIPLE PHOTODETECTOR SEGMENTS

BACKGROUND

Technologies, such as touch sensitive screens, have allowed users to provide inputs to electronic devices, such as mobile phones and tablet computers, without requiring the use of a mouse and/or a keyboard. Examples of touch sensitive screens include capacitive sensors, pressure sensitive membranes, beam break techniques with circumferential light sources and sensors, and acoustic ranging techniques. However, these types of interfaces can only provide information to the device regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events.

As an alternative to touch sensitive screens, optical motion and/or gesture recognition sensors have been developed, which can be used to recognize different motions of an object (e.g., a persons finger) within the sense region of the sensor. Typically, such optical sensors rely on multiple spatially dispersed light sources, multiple spatially dispersed light detectors, or both, to enable them to distinguish between motion in one or two directions. For example, one existing sensor includes a photodetector that is flanked on both sides by infrared light emitting diodes (IR-LEDs) spaced several tens of millimeters away from the photodetector to provide sufficient angular resolution, and a third IR-LED that is spaced several tens of millimeters away from the photodetector in a direction orthogonal to the line of the first two IR-LEDs and the photodetector. The IR-LEDs are pulsed one at a time, sequentially, such that the detected reflected light signals can be associated with the correct light source and its known location relative to the photodetector. From the detected reflected light pulses, a gesture recognition algorithm determines the direction and velocity of a target object, such as a user's finger.

A disadvantage of the exemplary optical sensor described above is that it requires at least three spatially dispersed light sources to detect movement in two directions (e.g., the x-direction and the y-direction), or at least two spatially dispersed light sources to detect movement in one direction (e.g., only the x-direction). Accordingly, such a sensor requires a relatively large footprint because of the spatial distances required between the light sources and the photodetector. Additionally, such a sensor requires a relatively large aperture (i.e., window) above the light sources, or requires multiple apertures.

Because these sensors are often included in portable devices, such as mobile phones, tablet computers, or the like, it would be beneficial to reduce the footprint of such devices. Additionally, it would be beneficial to reduce the number of light sources required for such sensors, e.g., to make it easier to incorporate the sensors into the devices, such as mobile phones, tablet computers, and the like.

DETAILED DESCRIPTION

Figure 1:
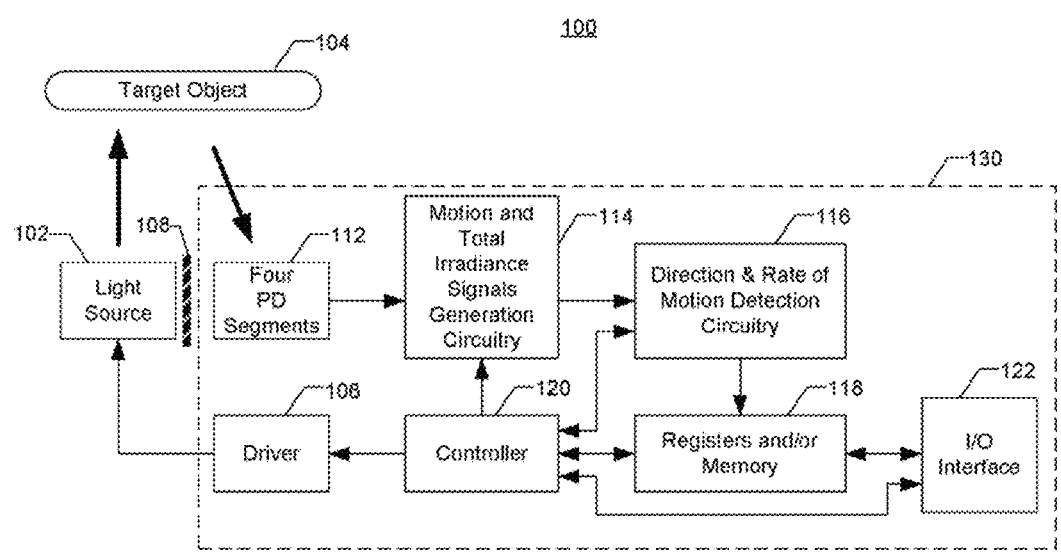
FIG. 1 illustrates an optoelectronics apparatus, according to an embodiment of the present invention, which can be used for simple gesture recognition.

FIG. 1 illustrates an optoelectronics apparatus 100 (which can also be referred to as an optical sensor, an optical motion sensor, or a gesture recognition sensor), according to an embodiment of the present invention, which can be used for motion detection, which can include simple gesture recognition. For example, as will be described in more detail below, the optoelectronics apparatus 100 can be used to detect horizontal left-to-right motion, horizontal right-to-left motion, vertical up-to-down motion and vertical down-to-up motion. The optoelectronics apparatus 100 can also be used to detect an angle of motion. Additionally, as will be described below, the optoelectronics apparatus 100 can be used to distinguish between an active stroke motion and a retrace motion.

Referring to FIG. 1, the optoelectronics apparatus 100 is shown as including a driver 106 that selectively drives a light source 102. The light source 102 is preferably a single light emitting element, such as, but not limited to, a light emitting diode (LED), an organic LED (OLED), a bulk-emitting LED, a surface-emitting LED, a vertical-cavity surface-emitting laser (VCSEL), a superluminescent light emitting diode (SLED), a laser diode, or a pixel diode. The light source 102 can emit infrared (IR) or near IR light, or light of other wavelengths. The driver 106 is controlled by a controller 120, which can be implemented using a microprocessor, state machine and/or similar circuitry.

The optoelectronics apparatus 100 also includes four photodetector (PD) segments 112, which are electrically isolated from one another. If there is an object 104 (also referred to as a target, or target object) within the sense region of the optoelectronics apparatus 100 when the driver 106 drives the light source 102 to emit light, then a portion of the emitted light will reflect off of the object and be incident (to varying degrees) on the four PD segments 112, as will be explained in more detail below. Each of the four PD segments will produce an output signal (e.g., a current signal) that is indicative of the intensity of the detected light. The outputs of the four PD segments 112 are provided to motion and total irradiance signals generation circuitry 114, which is also controlled by the controller 120. The outputs of the motion and total irradiance signals generation circuitry 114 is provided to direction and rate of motion detection circuitry 116. Additional details of the four PD segments 112 and the motion and total irradiance signals generation circuitry 114, according to specific embodiments of the present invention, will be discussed below with reference to FIG. 2A. Additional details of the direction and rate of motion detection circuitry 116, according to specific embodiments of the present invention, will be described below with reference to FIG. 2B.

In accordance with an embodiment, each of the four PD segments 112 is preferably as close as possible to its neighboring PD segments, so as to minimize the overall footprint of the optical sensor 100. Additionally, the light source 102 is preferably as close as possible to the closest two of the four PD segments 112, so as to minimize the overall footprint of the optical sensor 100, and to minimize the effects of the light source and PD segments being spatially offset relative to one another. In accordance with an embodiment, an opaque light barrier 108 optically isolates the light source 102 from the four PD segments 112, so as to reduce and preferably prevent any light from being transmitted directly from the light source 102 to the PD segments 112, without first reflecting off an object 104.

Depending upon the wavelengths of light being emitted by the light source 102, it may be beneficial for the PD segments 112 to be covered by appropriate filters (e.g., filters that block visible light) to reject ambient light, so that the PD responses are not swamped by ambient light. Additionally, or alternatively, other techniques can be used to reject or otherwise compensate for ambient light, such as, but not limited to, those disclosed in commonly assigned U.S. patent application Ser. No. 12/716,220, entitled "Proximity Sensors with Improved Ambient Light Rejection", filed Mar. 2, 2010, by Xijian Lin.

The optoelectronics apparatus 100 is also shown as including registers and/or memory 118 that is used to store motion detection data. An input/output interface 122 can be used to access such motion detection data stored in the registers and/or memory 118. The controller 120 also controls the I/O interface 112, can receive instructions via the I/O interface, and can output instructions to external circuitry/processors via the I/O interface. In accordance with a specific embodiment, all of the elements shown in FIG. 1, except for the light source 102, are included in a single integrated circuit (IC) package 130, which can also be referred to as a single chip 130. In other embodiments, all of the elements shown in FIG. 1, including the light source 102, are included in a single chip package. It is also possible that a plurality of discrete components and/or discrete dies is used.

Figure 2A:
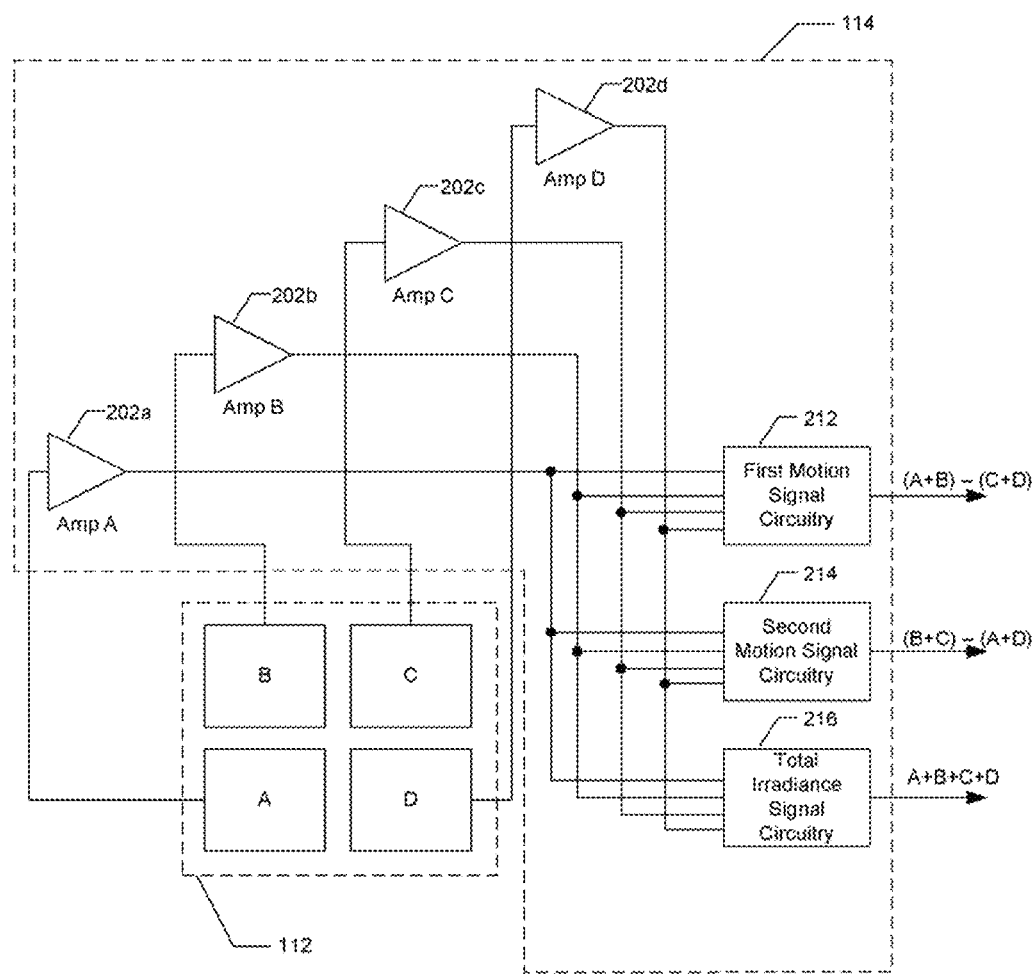
FIGS. 2A and 2B provide additional details of the circuitry of the optoelectronics apparatus of FIG. 1, according to specific embodiments of the present invention.

Referring now to FIG. 2A, the four PD segments 112 are labeled A, B, C and D. Each PD segment can include a single light detecting element that outputs a signal (a current or voltage signal) indicative of the light incident on and detected by the PD segment. Alternatively each PD segment can include a plurality of light detecting elements that are connected together in series and/or parallel so that each PD segment produces a single output signal indicative of the light detected by the PD segment. Each such light detecting element can be a photodiode, a photoresistor, a photovoltaic cell, a phototransistor, or a charge-coupled device (CCD), but is not limited thereto. The labels A, B, C and D are also used to label the signals output by the respective PD segments A, B, C and D. More specifically, the PD segment A produces a signal A indicative of the reflected light that is incident of the PD segment A, the PD segment B produces a signal B indicative of the reflected light that is incident of the PD segment B, the PD segment C produces a signal C indicative of the reflected light that is incident of the PD segment C, and the PD segment D produces a signal D indicative of the reflected light that is incident of the PD segment D. In the embodiment shown, the four PD segments are arranged in a common plane in a two-by-two grid, which can also be referred to as quadrature detector configuration. For the remainder of this description, unless otherwise stated, it will be assumed that the A, B, C and D signals are current signals As just explained, each of the four electrically isolated PD segments produces a corresponding signal (e.g., current) indicative of light detected by the PD segment. These signals are provided to the motion and total irradiance signals generation circuitry 114. In accordance with an embodiment, the circuitry 114 includes respective amplifiers 202A, 202B, 202C and 202D for each of the PD segments, which can be referred to collectively as amplifiers 202, or individually simply as amplifier 202. Each amplifier 202 is used to amplify the relatively low amplitude signal generated by one of the PD segments. In specific embodiments, each amplifier 202 can be implemented as a transimpedance amplifier (TIA), which provides amplification and coverts a current produced by each PD segment to a corresponding voltage, in which case a resistor can be used to convert the voltage at the output of the TIA back to a current, if currents are added and subtracted by the circuitry 212, 214 and 216. Alternatively, the circuitry 212, 214 and 216 can add and subtract voltage signals, in which case there would be no need to convert the voltage at the output of each TIA back to a current. Additional and/or alternative types of amplifiers can also be used. One of ordinary skill in the art would recognize that additional circuitry, such as current mirrors, can be used to replicate the currents A, B, C and D (or amplified versions thereof) so that there are three instances of each current, with one instance of each of the currents (or an amplified version thereof) provided to each of the circuitry 212, 214 and 216. It is also possible that such current mirrors or other circuitry can provide amplification by having a predetermined gain.

The motion and total irradiance signals generation circuitry 114 is also shown as including first motion signal circuitry 212, second motion signal circuitry 214 and total irradiance signal circuitry 216. The first motion signal circuitry 212 produces a first motion signal that is indicative of a sum of the A current and the B current (A+B) minus a sum of the C current and the D current (C+D). Accordingly, the signal output of the first motion signal circuitry 212 is indicative of (A+B)−(C+D), which can also be referred to as ΔX or the horizontal motion signal, which is indicative of motion in the x-direction (i.e., the horizontal direction relative to the four PD segments 112). The second motion signal circuitry 214 produces a second motion signal that is indicative of a sum of the B current and the C current (B+C) minus a sum of the A current and the D current (A+D). Accordingly, the output of the second motion signal circuitry 214 is indicative of (B+C)−(A+D), which can also be referred to as ΔY or the vertical motion signal, which is indicative of motion in the y-direction. The total irradiance signal circuitry 216 produces a signal indicative of the sum of the A, B, C and D currents. Accordingly, the output of the total irradiance signal circuitry 216 is indicative of A+B+C+D, which can also be referred to as ΔE. As the terms are used herein, the x-axis and the y-axis are perpendicular to one another and define a plane that is parallel with a top surface of the four PD segments 112, and the z-axis is orthogonal to the plane formed by the x-axis and the z-axis.

Exemplary details of the direction and rate of motion detection circuitry 116, according to certain embodiments of the present invention, will now be described with reference to FIG. 2B. Each of the blocks shown in FIG. 2B can be implemented using hardware, software or firmware, or combinations thereof.

Figure 2B:
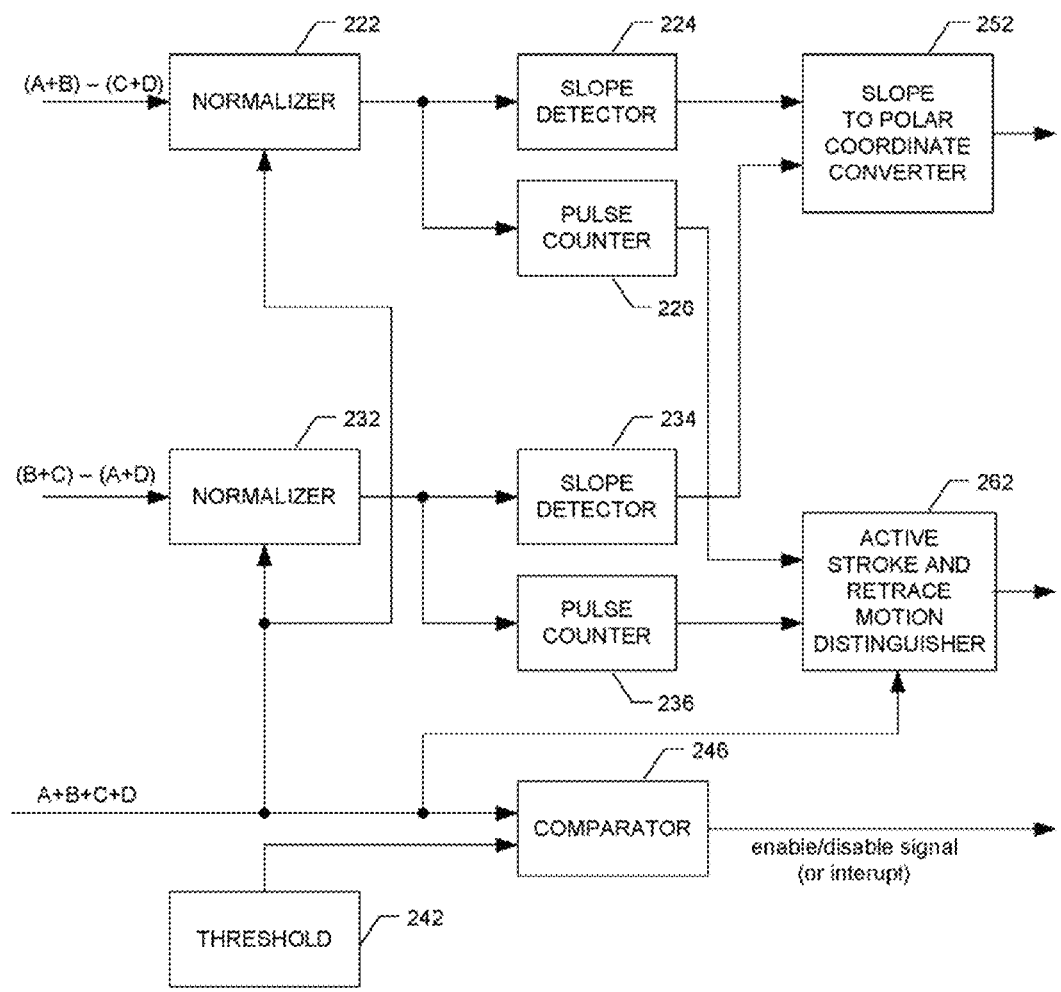

Referring to FIG. 2B, the first motion signal indicative of (A+B)−(C+D), also referred to as ΔX, is provided to a normalizer 222, which also receives the total irradiance signal indicative of A+B+C+D, also referred to as ΔE. In accordance with an embodiment, the normalizer 222 uses the total irradiance signal to normalize the first motion signal, e.g., using the following equation:

$$n\Delta X = \Delta X/\Delta E = ((A+B)-(C+D))/(A+B+C+D).$$

The normalization can be performed in the analog domain. Alternatively, each of the aforementioned signals can be converted to digital signals, using analog-to-digital converters (ADCs), and the normalization can be performed in the digital domain. In a specific embodiment, the normalizer 222 can be implemented as an ADC that uses the total irradiance signal indicative of A+B+C+D signal as a reference current for the ADC. Regardless of the specific implementation, the output of the normalizer 222 is a normalized first motion signal, which can also be referred to as nΔX.

The normalized first motion signal nΔX is provided to a slope detector 224 and a pulse counter 226. The slope detector 224 determines the slope of the of the nΔX signal at the zero crossing near the 0 point of a plot indicative of motion in the x-direction. The magnitude of the slope is indicative of the extent of motion, if any, of an object in the x-direction. The polarity of the slope indicates whether the motion in the x-direction, if any, is horizontally left-to-right or right-to-left. In accordance with specific embodiments, a positive slope is indicative of motion from right-to-left (from PD segments C and D, toward PD segments A and B), and a negative slope is indicative of motion from left-to-right (from PD segments A and B, toward PD segments C and D).

The second motion signal indicative of (B+C)−(A+D), also referred to as ΔY, is provided to a normalizer 232, which also receives the total irradiance signal indicative of A+B+C+D, also referred to as ΔE. In accordance with an embodiment, the normalizer 232 uses the total irradiance signal ΔE to normalize the second motion signal, e.g., using the following equation:

$$n\Delta Y = \Delta Y/\Delta E = ((B+C)-(A+D))/(A+B+C+D).$$

The normalization can be performed in the analog domain. Alternatively, each of the aforementioned signals can be converted to digital signals, using ADCs, and the normalization can be performed in the digital domain. In a specific embodiment, the normalizer 232 can be implemented as an ADC that uses the total irradiance signal indicative of A+B+C+D as a reference current for the ADC. Regardless of the specific implementation, the output of the normalizer 232 is a normalized second motion signal, which can also be referred to as nΔY.

The normalized second motion signal nΔY is provided to a slope detector 234 and a pulse counter 236. The slope detector 234 determines the slope of the nΔY at the zero crossing near the 0 point of a plot indicative of motion in the y-direction. The magnitude of the slope is indicative of the extent of motion, if any, of an object in the y-direction. The polarity of the slope indicates whether the motion in the y-direction, if any, is vertically up-to-down or down-to-up. In accordance with specific embodiments, a positive slope is indicative of motion from down-to-up (from PD segments A and D, toward PD segments B and C), and a negative slope is indicative of motion from up-to-down (from PD segments B and C, toward PD segments A and D). Additional explanations and details of the use of the horizontal and vertical motions signals and their slopes can be appreciated from the below discussions of FIGS. 3-8, 11 and 12. Where one of the horizontal and vertical motions signals has a zero slope near the 0 point of a plot (and thus, no zero crossing at that point), this is indicative of no motion in one of the horizontal and vertical directions, as will be appreciated from the discussion of FIGS. 3, 5, 6 and 12 below.

The outputs of the slope detectors 224 and 234 are provided to a slope to polar coordinate converter 252, which can convert the slope information to polar coordinate information. In accordance with an embodiment, the slope to polar coordinate converter 252 uses the arctan function to perform its conversion. For example, if the slope of the nΔX signal (which is indicative of the rate of change in signal magnitude to change in distance) is approximately twice that of the slope of the nΔY signal, this is indicative of the angle of motion being approximately 30° from the x-axis, which can be calculated using the acrtan function, i.e., arctan 0.5=26.5°. An equation or a look-up-table can be used to determine the angle of motion based on the arctan function.

Referring briefly back to FIG. 1, in accordance with specific embodiments the light source 102 is pulsed to transmit light pulses toward the target 104. This enables the pulse counter 226 to count a number of pulses of reflected light associated with the nΔX that are detected during a motion cycle. This number is inversely proportional to a rate of motion of an object in the x-direction, as can be appreciated from the discussion of FIGS. 10 and 11 below. The pulse counter 236 similarly counts a number of pulses of reflected light associated with the nΔY that are detected during a motion cycle. This number is inversely proportional to a rate of motion of an object in the y-direction, as can be appreciated from the discussion of FIGS. 10 and 11 below.

The outputs of the pulse counters 226 and 236 are provided to an active motion and retrace motion distinguisher 262, which also receives the total irradiance signal ΔE indicative of A+B+C+D. In a manner described below in more detail with reference to FIGS. 10 and 11, the active stoke and retrace motion distinguisher 262 can distinguish between an "active stroke" motion and a "retrace" motion. As the terms are used herein, an "active stroke" motion is the motion intended to cause an action, and a "retrace" motion is the motion intended to return the hand for another active stroke. Accordingly, an active stroke motion can be considered analogous (in terms of its function) to moving a mouse device along a surface of a mouse pad from a first position to a second position, and a retrace motion can be considered analogous (in terms of its function) to picking up the mouse device and moving it back to the first position while the mouse device is not touching the surface of the mouse pad. For another analogy, an active stroke motion can be considered analogous (in terms of its function) to moving a finger from a first position to a second position along a touch pad, and a retrace motion can be considered analogous (in terms of its function) to picking up the finger and moving it back to the first position. Distinguishing between an active stroke motion and a retrace motion can be especially important when gestures are used for up/down or left/right operations that increase/decrease audio volume, display brightness, or the like. As will be explained in additional detail below, the less pulses counted during a detected motion, the faster the motion. Additionally, the greater the irradiance signal during a detected motion, the closer the target is to the sensor 100. As will be described in more detail below with reference to FIGS. 10 and 11, by assuming that an active stroke motion occurs faster and closer to the sensor 100 than a retrace motion, the active stroke and retrace motion distinguisher 262 can distinguish between an active stroke motion a retrace motion.

The total irradiance signal ΔE indicative of A+B+C+D (or a digitized version thereof produced using an ADC) is also provided to a comparator 246 that compares the total irradiance signal to a ΔE threshold value, which can be stored, for example, in a register 242. In accordance with specific embodiments, the sensor 100 is only used if the ΔE threshold (which can also be referred to as a total irradiance threshold) is reached. For another example, the ΔE threshold can be used to generate an interrupt that tells the controller 120, or some other processor or circuitry, that a target object is out of range.

Figure 3:
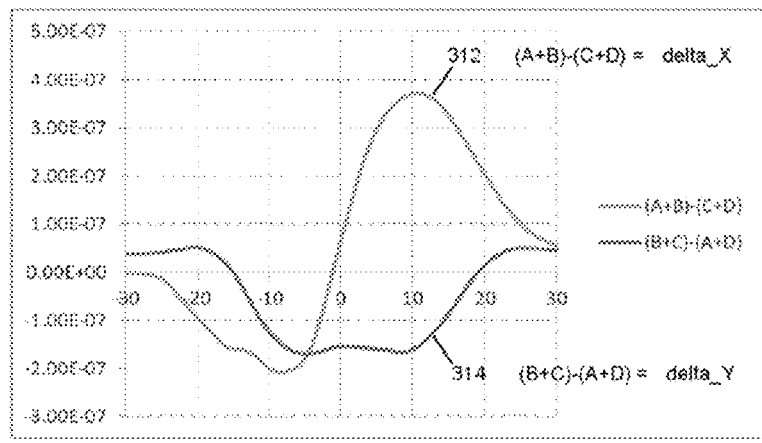
FIG. 3 illustrates exemplary motion signals that can be produced, using embodiments of the present invention, for a target moving in only one direction (the x-direction), and more specifically, shows results of an optical ray trace simulation for a target moving along the x-direction only.

FIG. 3 shows the results of an optical ray trace simulation for a 2 cm target (which is approximately the width of two human fingers) moving in the x-direction only (from right-to-left), starting at a position 30 mm to the right of the four PD segments 112 and terminating 30 mm to the left of the four PD segments 112. The target was modeled as an 18% (nominal) reflecting gray card, which reflects light in a similar manner and with similar base-reflectivity to that of Caucasian human skin. The plotted curve 312 corresponds to the first motion signal indicative of (A+B)−(C+D), which as mentioned above can also be referred to as ΔX or the horizontal motion signal. The plotted curve 314 corresponds to the second motion signal (B+C)−(A+D), which as mentioned above can also be referred to as ΔY or the vertical motion signal. The zero-crossing of the ΔX signal near the 0 point of the plot is indicative of motion in the x-direction. The positive slope of the ΔX signal at the zero-crossing is indicative of the motion being from right-to-left, and more specifically, in the direction from the PD segments C and D toward the PD segments B and A. If the motion was instead from left-to-right, the slope of the ΔX signal at the zero-crossing would be negative. The asymmetry of the ΔX signal and the shape of the ΔY signal are due to the location offset of the light source relative to the center of the quadrature detector configuration.

Figure 4:
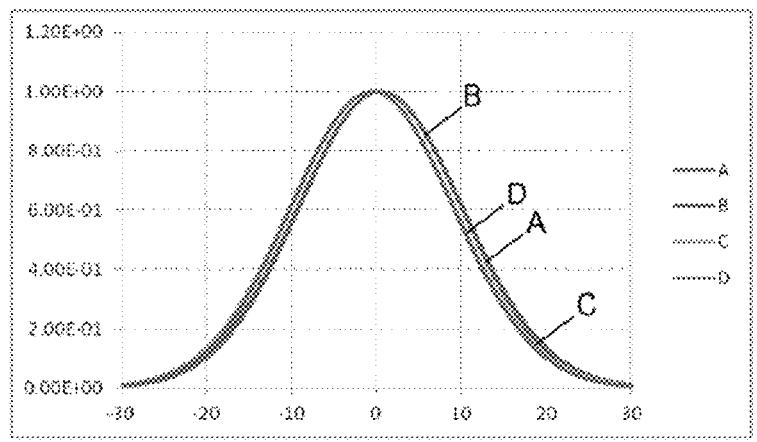
FIG. 4 illustrates four simulated individual raw current signals that can be produced by the four photodetector segments of the optoelectronics apparatus described with reference to FIGS. 1, 2A and 2B.
Figure 5:
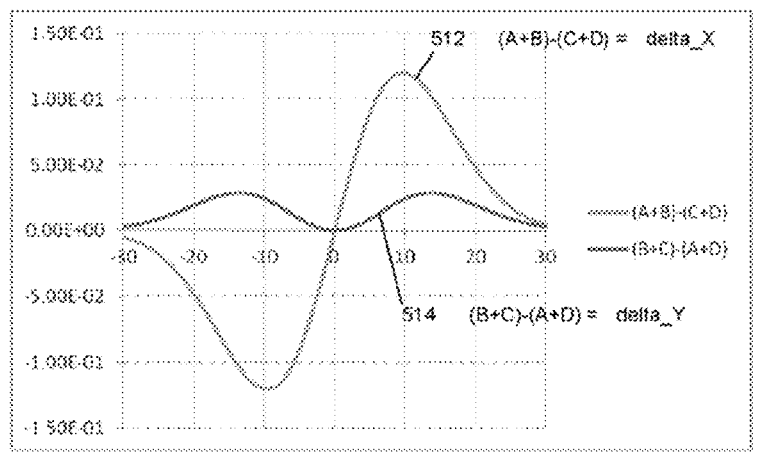
FIG. 5 is similar to FIG. 3, but illustrates analytically generated "ideal" responses for the theoretical case in which the light source occupies the same spatial location as the four photodetector segments.

FIG. 4 shows the four individual raw photocurrent signals A, B, C and D produced by the four PD segments A, B, C and D in response to light reflected from the moving target 104. The very small shift in the signals is due to the spatial positioning of the four detectors. In this example, the light reflected from the target is incident first on PD segments C and D, and then on the PD segments A and B. In FIG. 5, the plotted curve 512 corresponds to the first motion signal indicative of (A+B)−(C+D), and the plotted curve 514 corresponds to the second motion signal indicative of (B+C)−(A+D).

Figure 6:
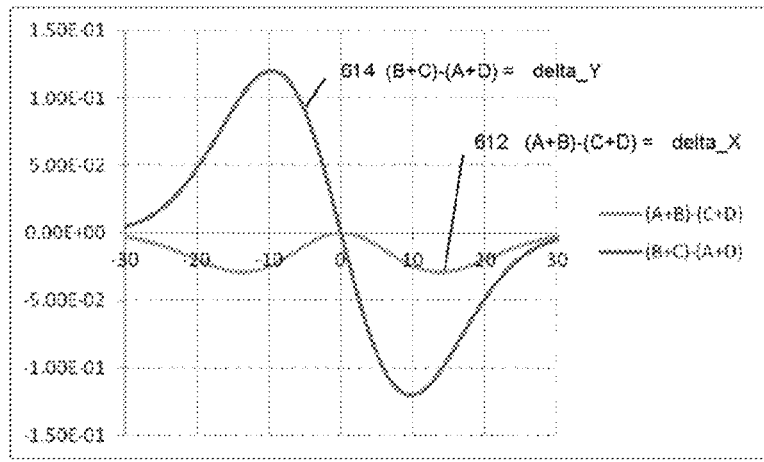
FIG. 6 illustrates exemplary motion signals that can be produced, using embodiments of the present invention, for a target moving in only one direction (the y-direction), and more specifically, shows results of an optical ray trace simulation for a target moving along the y-direction only.

FIG. 6 shows similar results for the target 104 moving only in the y-direction, where the plotted curve 612 corresponds to first motion signal indicative of (A+B)-(C+D), and the plotted curve 614 corresponds to the second motion signal indicative of (B+C)−(A+D). Thus, in FIG. 6, the ΔY signal has a zero-crossing near the 0 point of the plot, which is indicative of motion in the y-direction. The negative slope of the ΔY signal at the zero-crossing is indicative of the motion being from up-to-down, or more specifically, in the direction from the PD segments B and C toward the PD segments A and D. If the motion was instead from down-to-up, the slope of the ΔY signal at the zero-crossing near the 0 point of the plot would be negative.

FIGS. 4, 5 and 6 are analytically generated "ideal" responses for the theoretical case in which the light source (e.g., an LED) occupies the same spatial location as the four PD segments 112. Although this is practically impossible, it serves to illustrate the symmetry of the arithmetic signals. In practice, the light source will typically be offset in either the x-direction or the y-direction, or both. This offset produces a "projection" of the light illumination, at some angle, on the four PD segments 112, thus, producing the asymmetry in the ΔX signal shown in FIG. 3 from the optical ray trace. To some degree, this can be compensated for in the optical system design, as will be described later.

When the target moves only in one axial direction (either the x-direction, or the y-direction), only the signal representing that direction will exhibit the distinct zero crossing near the 0 point of the plot, with the 0 point of the plot corresponding to the center point of the four PD segments collectively. In the truly ideal condition in which the reflected light produces equal irradiance on both the B and C PD segments and the A and D PD segments (for a target moving only in the x-direction), the ΔY signal will be zero for all distances. In practice, this will likely never occur. Rather, one of the PD pairs (B and C, or A and D) will receive more irradiance than the other pair. This results in a non-zero ΔY signal as shown by the plotted curve 514 in FIG. 5. However, this imbalanced signal does not produce the distinct zero-crossing motion signal curve, and thus, discrimination of the direction of target motion is still clear. Referring back to FIG. 3, the optical ray trace simulation shows that the non-motion signal curve signal 314 may indeed produce zero-crossings. However, these zero-crossing will not occur at or near the 0 point of the plot as FIG. 3 shows.

Figure 7:
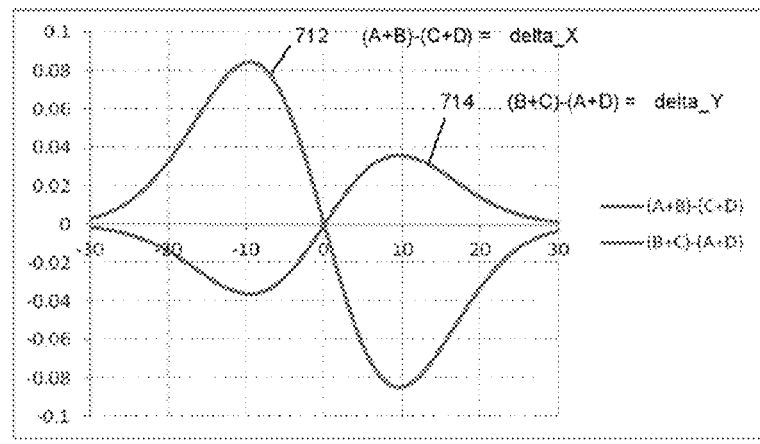
FIG. 7 illustrates exemplary motion signals that can be produced, using embodiments of the present invention, for a target moving at approximately 30° to the x-axis.

The motion of a target may not be in only one of the x- and y-directions. Embodiments of the present invention can also detect target motion at angles relative to the x- and y-axes. FIG. 7 shows the plotted curves 712 and 714, for ΔX and ΔY signals respectively, where the target motion is at approximately 30° relative to the x-axis (from the PD segment A towards the PD segment C). In this case, both the ΔX and ΔY signals include distinct zero-crossings near the 0 point of the plot. The direction of target motion is determined by the polarity and magnitude of the slopes of the two signals. The negative polarity slope of the $\Delta X$ signal at the zero-crossing near the 0 point of the plot indicates motion from the PD segments A and B toward the PD segments C and D (i.e., from left-to-right). The positive polarity slope of the $\Delta Y$ signal at the zero-crossing near the 0 point of the plot indicates motion from PD segments A and D toward the PD segments B and C (i.e., from down-to-up). Thus, the true motion is from the PD segment A towards the PD segment C. The magnitude of the slope of the $\Delta X$ signal (which is indicative of the rate of change in signal magnitude to change in distance) is approximately twice that of the magnitude of the slope of the $\Delta Y$ signal. This indicates that the angle of motion is approximately 30° from the x-axis, which can be calculated using the arctan function, i.e., arctan 0.5=26.5°. An equation or a look-up-table can be used to determine the angle of motion based on the arctan function.

Figure 8:
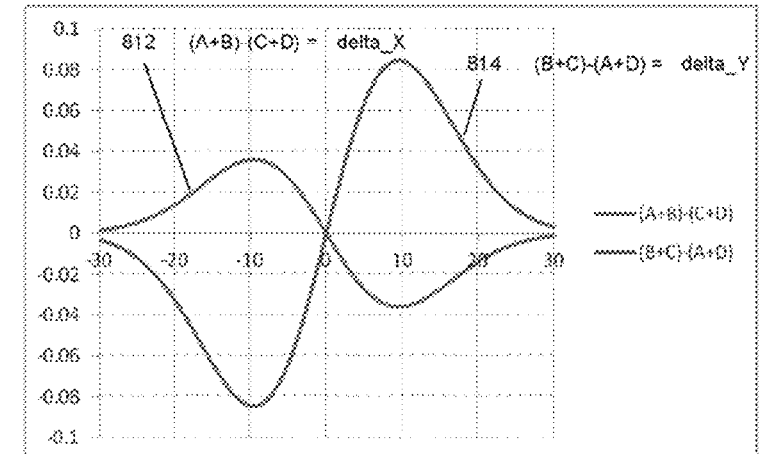
FIG. 8 illustrates exemplary motion signals that can be produced, using embodiments of the present invention, for a target moving at approximately 60° to the x-axis.

Likewise, FIG. 8 shows the case in which the target motion is approximately 60° relative to the x-axis, with the motion again being from the PD segment A toward the PD segment C. However, in this case, the slope of the $\Delta X$ signal (i.e., plotted curve 812) is approximately ½ the slope of the $\Delta Y$ signal (i.e., plotted curve 814). This indicates that the angle of motion is approximately 60° from the x-axis, which can be determined using the arctan function, i.e., arctan 2.0=63.4°.

Figure 9:
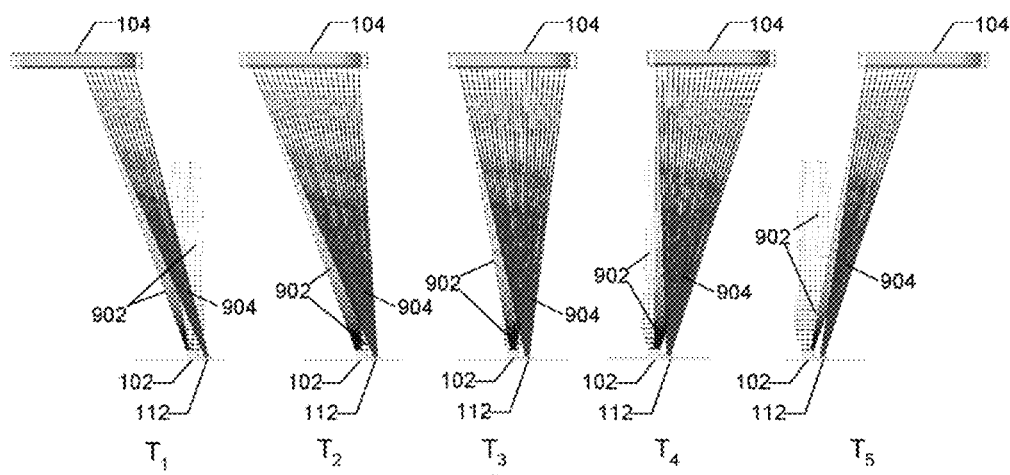
FIG. 9 illustrates a typical unidirectional gesture scan motion of a target, at five successive points in time, and the light rays emitted by the light source, and the light rays scattered by the target back toward the four photodetector segments.

FIG. 9 illustrates a typical unidirectional motion of a target 104, at five successive points in time (labeled $T_1$, $T_2$, $T_3$, $T_4$ and $T_5$) and light rays 902 emitted by the light source 102, and the rays 904 reflected by the target 104 back toward the four PD segments 112. The rays 902 in FIG. 9 that are shown as dashed lines are the emitted rays that "miss" the target 104. The target 104, located at the top of the FIG., moves left-to-right at a height of ~50 mm above the sensor. The target 104 is 20×20 mm and exhibits gray card scattering properties. FIG. 9 shows the target moving from ~20 mm left of the sensor (approximately the limit of detection) to ~20 mm to the right of the sensor in 10 mm steps. It can be appreciated from FIG. 9 that the light ray density (and thus, the total irradiance $\Delta E$) increases as the target approaches the directly overhead position, at time $T_3$, and decreases as the target 104 continues to move to the right.

The ray trace models shown in FIGS. 3-8 used 50 mm (~2 inches) as the "typical" distance in the z-direction between the target 102 and the four PD segments 112. However, as can be appreciated from FIGS. 1 and 9, the magnitude of the reflected light that is incident on the PD segments will depend on the distance, in the z-direction, that the target object 104 is from the four PD segments 114. More specifically, the closer the object 104 (i.e., the smaller the distance in the z-direction), the greater the intensity, and the farther the object 104 (i.e., the greater the distance in the z-direction), the lower the intensity. In accordance with specific embodiments of the present invention, in order to compensate for the variations in the distances, in the z-direction, between the target object 104 and the PD segments 114, the motion signals $\Delta X$ and $\Delta Y$ are normalized with respect to the total irradiance signal indicative of A+B+C+D, which can also be referred to as $\Delta E$. Hence, $n\Delta X=\Delta X/\Delta E$, and $n\Delta Y=\Delta Y/\Delta E$, where $n\Delta X$ is the normalized first motion signal indicative of motion in the x-direction, and $n\Delta Y$ is the normalized second motion signal indicative of motion in the y-direction. Expressed another way, $n\Delta X=((A+B)-(C+D))/(A+B+C+D)$ and $n\Delta Y=((B+C)-(A+D))/(A+B+C+D)$. Such normalization provides automatic gain compensation for the motion signals, thereby allowing the motion signals to retain approximately the same magnitude over a range of distances in the z-direction between the target 104 and the PD segments 112. Stated another way, the normalization eliminates motion signal sensitivity to target motion in the z-direction. Referring back to FIG. 2B, the normalizers 222 and 232 can perform such normalization.

The optoelectronics apparatus 100 can be used to detect simple gestures such as horizontal left-to-right motion, horizontal right-to-left motion, vertical up-to-down motion and vertical down-to-up motion. Additionally, the optoelectronics apparatus 100 can be used to detect motion at an angle relative to the x- and y-axes, as was just explained above. The detected simple gestures can be used, e.g., to control a parameter (such as volume and/or brightness) of an electronic device, to move a cursor on a screen, or to control operation of a video game, but is not limited thereto. For gesture recognition of human hand motion, it is quite typical that the motion will not remain within a plane parallel to the gesture recognition sensor. Rather, the human hand motion may rise, or fall during the "active stroke" motion, which is a term used to specify motion intended to cause an action. This change in the z-direction could vary the slope of the detected motion signals, potentially causing gesture detection errors. The irradiance normalization described above reduces and preferably eliminates this source of error.

Irradiance normalization should not be used indefinitely, because as the target distance increases the performed normalization will include division by smaller and smaller values, which increases the noise in the normalized signals. In accordance with specific embodiments, the total irradiance ($\Delta E$) signal is thresholded to limit the range of the gesture detection to usable values, in order to reduce and preferably minimize gesture detection errors. For example, a $\Delta E$ threshold can be specified, such that the sensor is only used if the $\Delta E$ threshold (which can also be referred to as a total irradiance threshold) is reached. For another example, the $\Delta E$ threshold can be used to generate an interrupt that tells the controller 120, or some other processor or circuitry, that the target is out of range. Such thresholding can be achieved, e.g., using the comparator 246 in FIG. 2B, but is not limited thereto. In certain embodiments, when the total irradiance signal is less than the $\Delta E$ threshold, at least a portion of the optoelectronic apparatus 100 is disabled (e.g., portions 114 and 116 may be disabled). In other embodiments, when the total irradiance signal is less than the $\Delta E$ threshold, the optoelectronic apparatus 100 operates as normal, but the signal and/or data indicative of a direction and/or rate of motion of an object produced during that time is not used, knowing that such information is likely corrupted by noise.

Figure 10:
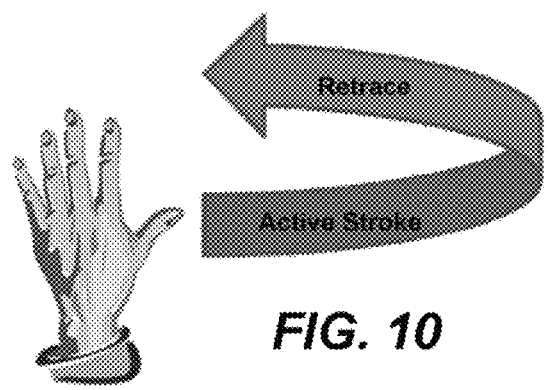
FIG. 10 illustrates an active stroke motion of a hand followed by a retrace motion.

Another challenge with human hand gesture recognition is discriminating between the "active stroke" motion (which is the motion intended to cause an action), the "retrace" motion (which is the motion intended to return the hand for another active stroke). As mentioned above, this can be especially important when the gesture is used for up/down or left/right operations that are used for increasing/decreasing audio volume or display brightness, etc. FIG. 10 illustrates the active stroke motion, and the retrace motion. For example, where a left-to-right gesture increases the audio level, while a right-to-left gesture decreases the audio level, multiple gestures may be used to increase/decrease the level more. The common human nature is to stroke (e.g., from left-to-right), retrace (e.g., from right-to-left), then stroke again (e.g., from left-to-right). However, it is contrary to human nature to remove the hand from the sensor field-of-view to perform the retrace. Therefore, if the gesture recognition system cannot distinguish between the active stroke motion and the retrace motion, the sensor will detect the multiple gesture actions as "up, down, up, down," etc., rather than "up, and up more." When a human performs a fanning motion, the natural action is to move more quickly during the active stroke than during the retrace, and to pull-back slightly during the retrace motion. So, a typical, "up, up more," motion sequence could be characterized as follows:

Active Stroke: Left-to-right; quickly; close to the sensor;
   Retrace: Right-to-left, less-quick, slightly farther from the sensor; and
   Active Stroke: Left-to-right; quickly; close to the sensor.

Figure 11:
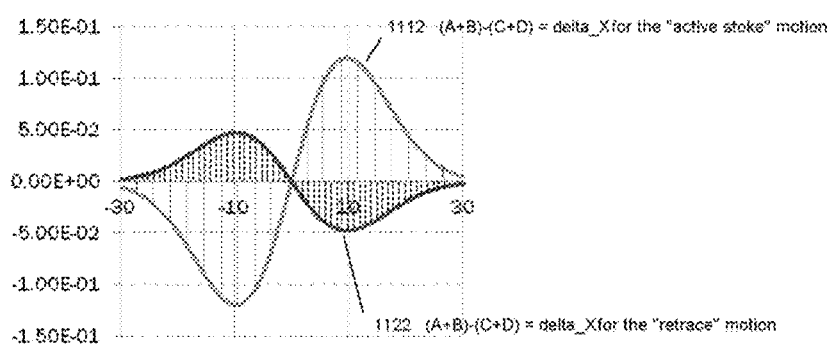
FIG. 11 illustrates how pulses can be counted to distinguish between an active stroke motion and retrace motion, in accordance with an embodiment of the present invention.

In accordance with specific embodiments, the gesture recognition is capable of recognizing the active stroke motion and the retrace motion and discriminating between the two. In certain embodiments, the light source 102 is driven by the driver 106 so that the emitted light is pulsed during motion sensing. Since the active stroke motion is faster than the retrace motion, the active stroke motion will generate fewer returning pulses than the retrace motion. Additionally, the returning signal magnitude (the total irradiance $\Delta E$) will be less for the retrace than for the active stroke. By counting the pulses during a multiple gesture motion cycle, and monitoring the $\Delta E$ signal, gestures can be accurately interpreted. For example, an accumulation counter (e.g., 226 in FIG. 2B) can be started in response to a first reflected pulse being detected by the PD segments 112. Pulses in one direction (e.g., left-to-right x-direction, or the right-to-left x-direction) increment the count value, while pulses in the opposite direction decrement the count value. In this manner, the active stroke motion can be identified as the direction in which motion occurred more quickly, as determined based on the number of pulses counted, and based on which motion occurred closer to the PD segments in the z-direction, as determined based on the total irradiance signal $\Delta E$. Conversely, the retrace motion can be identified as the direction in which motion occurred less quickly, as determined based on the number of pulses counted, and based on which motion occurred farther away from the PD segments in the z-direction, as determined based on the total irradiance signal $\Delta E$. FIG. 11 illustrates an exemplary horizontal motion signal 1112 corresponding to an active stroke motion, and a further horizontal motion signal 1122 corresponding to a retrace motion. In FIG. 11, the solid vertical lines illustrate how many reflected pulses are detected during the active stroke motion, and the dotted vertical lines illustrate how many reflected pulses are detected during the retrace motion. Referring back to FIG. 2B, the pulse counter 226 (and/or 236) and the active and retrace motion distinguisher 262 can be used to perform such distinguishing between an active stroke motion and a retrace motion.

In another embodiment, the $\Delta E$ threshold is set at a nominal distance from the PD segments such that the active stroke motion will occur within the active range (above threshold) and the retrace occurs outside the active range (below threshold). However, different skin pigmentation and clothing (e.g., gloves) will provide different $\Delta E$ magnitudes. This will cause the effective $\Delta E$ threshold to occur at different distances from the PD segments depending on the user's skin pigmentation and choice of glove color and material. This may not be an issue as humans typically learn quite quickly what works and what does not work and will adjust their actions accordingly. Hence, a user may learn to gesture closer to the sensor when wearing gloves than when not. It is also human nature that a retrace motion will occur within a short amount of time following an immediately preceding active stroke motion. Accordingly, if a first motion from left-to-right is detected, and a second motion from right-to-left is thereafter detected, the amount of time between the first and second gestures can be used to distinguish between whether the second motion is a retrace motion or a new active stroke motion.

Figure 12:
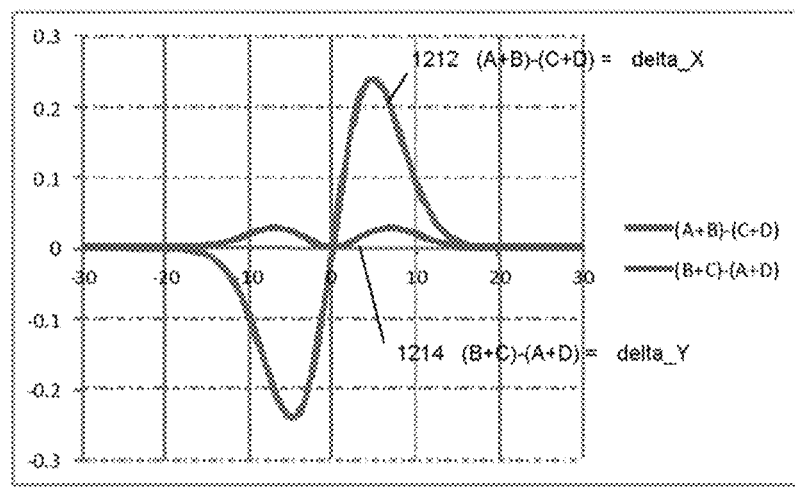
FIG. 12 is similar to FIG. 5, in that it illustrates analytically generated "ideal" motion signal responses for a target moving in only one direction (the x-direction), but for a smaller target compared to the target corresponding to FIG. 5.

Another aspect of human gesture motion is that the full human hand may not be used for the gesture operation, and, human hand sizes vary. Commonly, a single finger, or a pair of fingers, may be used to perform a gesture, especially if the location of the sensor is known to the user. FIG. 12 depicts the $\Delta X$ and $\Delta Y$ motion signals 1212 and 1214 for the case where a child's index finger is used for the gesture. FIG. 5, by comparison, depicts the same motion signals where the target is two adult fingers, which are collectively approximately 2 cm wide. The width of the motion signal curve and its peak magnitude are reduced in FIG. 12. But, the $\Delta X$ motion signal curve still has a zero-crossing near the 0 point of the plot. Likewise, the number of pulses detected during the active stroke motion and during the retrace motion will both be reduced. However, the characteristics associated with the motions (i.e., an active stroke motion occurs faster and closer to the sensor than a retrace motion) will be unchanged and, therefore, still be distinguishable. Single finger gestures may require the gesture to occur closer to the sensor than if two or more fingers are used to gesture. Again, however, human nature would consider this and the user would naturally learn to compensate accordingly.

Figure 13:
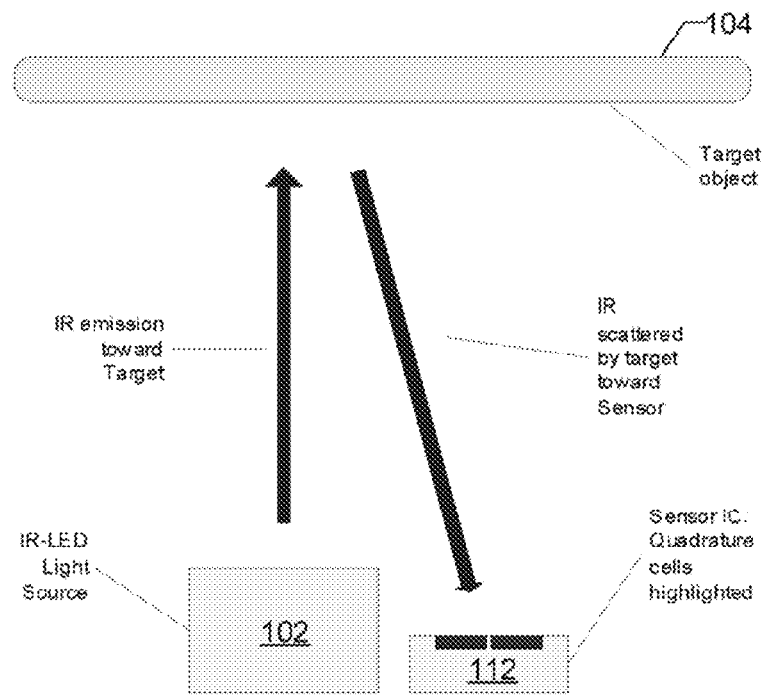
FIG. 13 illustrates an exemplary side view of the light source relative to the four photodetector segments, which is used to illustrate affects of the light source being spatially offset relative to the four photodetector segments.

In the above discussion of FIGS. 3-6, it was noted that the asymmetry of the motion signal curves was due to the offset position of the light source 102 relative to the overall center of the four PD segments 112. FIG. 13 illustrates this condition. The light is emitted by the light source 102 effectively in a vertical direction towards the target 104. Upon impinging the target 104, the light is reflected by the surface of the target 104 in many directions. Only the light reflected in the direction of the PD segments 112 will be detected by the PD segments 112. Since the light source 102 is offset from the overall center of the four PD segments 112, the reflected light that reaches the PD segments 112 will impinge at an angle, where that angle will be dependent on the range (distance in the z-direction from the target to the sensor) and the separation of the light source 102 and the center of the quadrature detector 112 in the x-direction. While the cross-section of the light impinging the target 104 will be essentially circular (since the light source emission surface is essentially circular), the cross-section of the reflected light returning to the sensor will be elongated along the axis of the sensor, by approximately the cosine of the angle.

Figure 14:
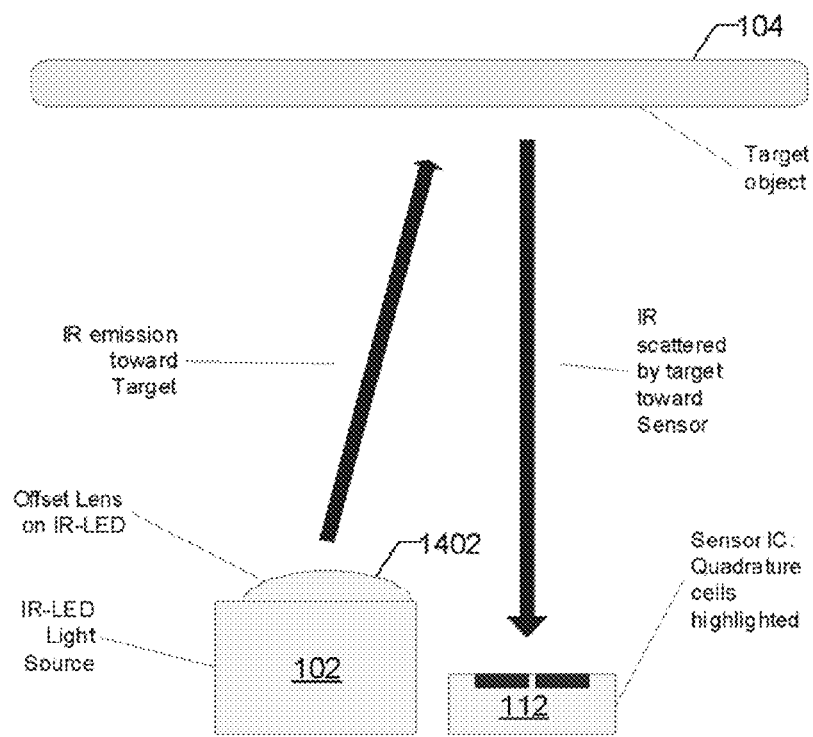
FIG. 14 illustrates an exemplary side view of the light source relative to the four photodetector segments, where a lens offset in the direction of the photodetector segments is used to reduce the affects of the light source being spatially offset relative to the four photodetector segments.

FIG. 14 illustrates a similar configuration to FIG. 13, except a lens 1402 has been added above the light source 102, where the lens 1402 is offset slightly towards the PD segments 112. The lens 1402 shifts the centroid of the light illumination from the vertical direction to a slightly angled direction. At some distance (d) in the z-direction, the light will impinge the target 104 directly above the PD segments 112 so that the light reflected toward the PD segments 112 will be reflected in the vertical direction. The cross-section of the light illuminating the target 104 remains essentially circular for the area of the target that will scatter toward the PD segments 112. Thus, the cross-section of the illumination reaching the PD segments 112 will be essentially circular in this instance, rather than elongated by the cosine of the angle (cosine 90°=1.0). However, this condition is only met for the target at a specific range. For any range less than this specific value, the light will impinge the PD segments 112 at an angle in the same direction illustrated in FIG. 13, however, at a reduced angle extent. For any range greater than the specific value, the light will impinge the PD segments 112 at an angle in the opposite direction to that illustrated in FIG. 13, also at a reduced angle extent. Thus, while not eliminating the offset asymmetry for all ranges, the magnitude of the offset effect will be reduced for most ranges. In FIGS. 13 and 14 it is assumed that the light source 102 is a single IR or near IR LED. However, as mentioned above, alternative types light emitting elements can be used and/or alternative wavelengths of light can be emitted.

In accordance with specific embodiments of the present invention, a single light source 102 and the four PD segments 112 are co-packaged. For example, referring back to FIG. 1, an integrated circuit 130 that includes the four PD segments 112 (and the other blocks shown within the dashed line) and the single light source 102 can be included in the same package, such as, but not limited to, the same optical-dual-flat-no-lead (ODFN) package.

Figure 15:
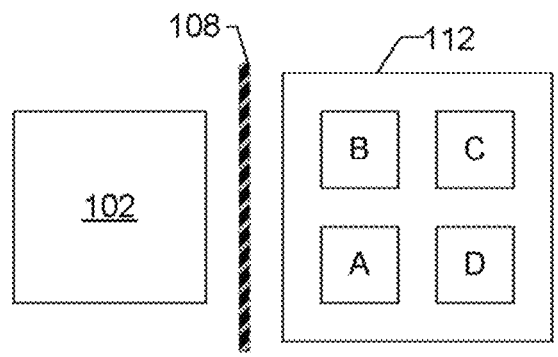
FIG. 15 illustrates an exemplary top down view of a single light source relative to four photodetector segments, according to certain embodiments of the present invention.
Figure 16:
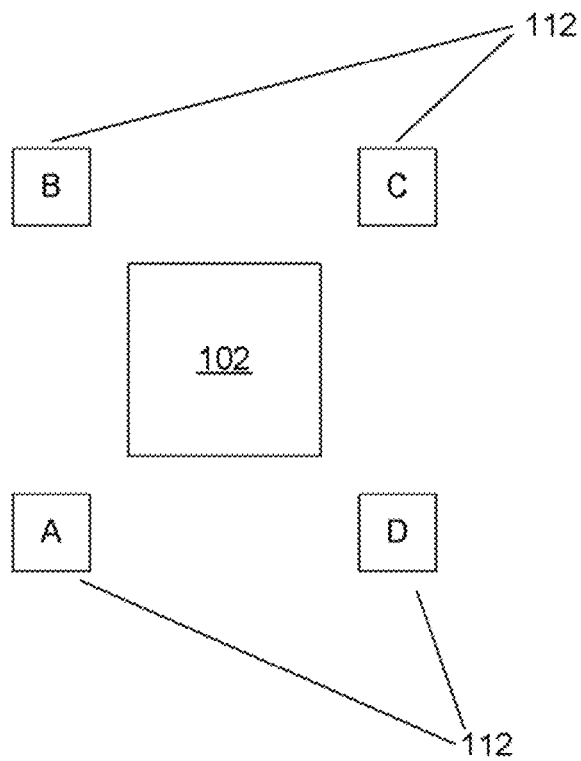
FIG. 16 illustrates an exemplary top down view of a single light source relative to four photodetector segments, according to alternative embodiments in which the light source is in the center relative to the photodetector segments.

FIG. 15 illustrates an exemplary top down view of the single light source 102 relative to the four PD segments 112, individually labeled A, B, C and D. Much of the description included above assumes a similar configuration to that shown in FIG. 15, where the light source is located to the same side of (e.g., to the left of) all four PD segments. FIG. 16 illustrates an exemplary top down view of the single light source 102 relative to the four PD segments 112, individually labeled A, B, C and D, according to an alternative embodiment where the light source 102 is centrally located relative to the A, B, C and D PD segments. For the embodiment of FIG. 16, a light barrier can be added that surrounds the light source 102 so as to optically isolate the light source 102 from the PD segments A, B, C and D. The embodiment of FIG. 15 is believed to be more practical than the embodiment of FIG. 16, because the embodiment of FIG. 15 can be more easily and more inexpensively manufactured. Additionally, with the embodiment of FIG. 15, the IC 130 that includes the four PD segments 112 (referring back to FIG. 1) can be manufactured and sold separately from the light source 102.

Figure 17:
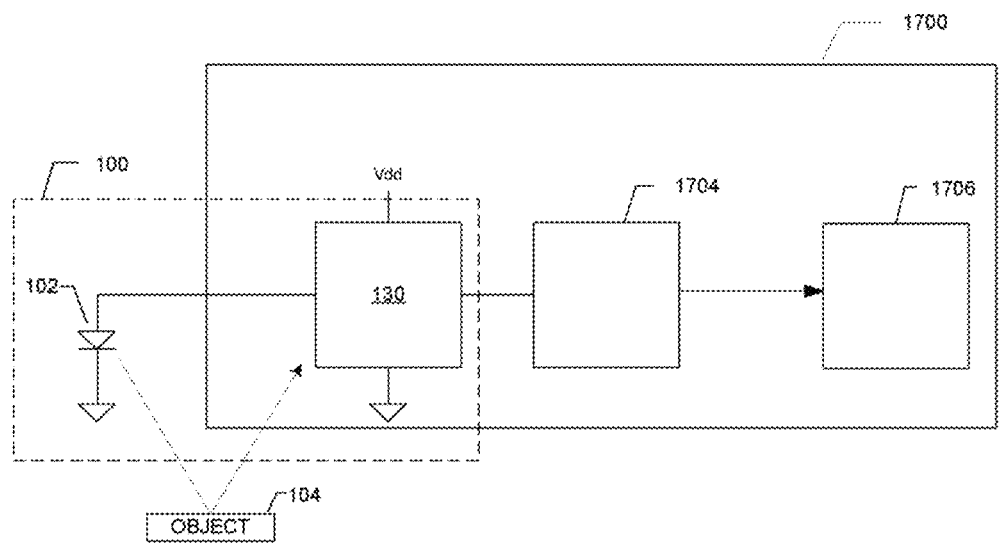
FIG. 17 illustrates a system in accordance with an embodiment of the present invention.

FIG. 17 is a high level block diagram of a system according to an embodiment of the present invention. Optical sensors of embodiments of the present invention can be used in various systems, including, but not limited to, mobile phones, tablets, personal data assistants, laptop computers, netbooks, other handheld-devices, as well as non-handheld-devices. Referring to the system 1700 of FIG. 17, for example, the optical sensor 100 can be used to control whether a subsystem 1706 (e.g., a touch-screen, display, backlight, virtual scroll wheel, virtual keypad, navigation pad, audio speaker etc.) is enabled or disabled, and whether the brightness, volume or other parameter of the subsystem is increased, decreased or otherwise modified. As was described above with reference to FIG. 1, the optical sensor 100 can include registers and/or memory 118 to store motion detection data, and an input/output interface 122 can be used to access such motion detection data stored in the registers and/or memory 118. Referring to FIG. 17, a processor 1704 or other circuitry can access the motion detection data in order to determine whether a gesture has been detected that is intended to control the subsystem 1706, and the processor 1704 or other circuitry can control the subsystem 1706 accordingly.

Figure 18:
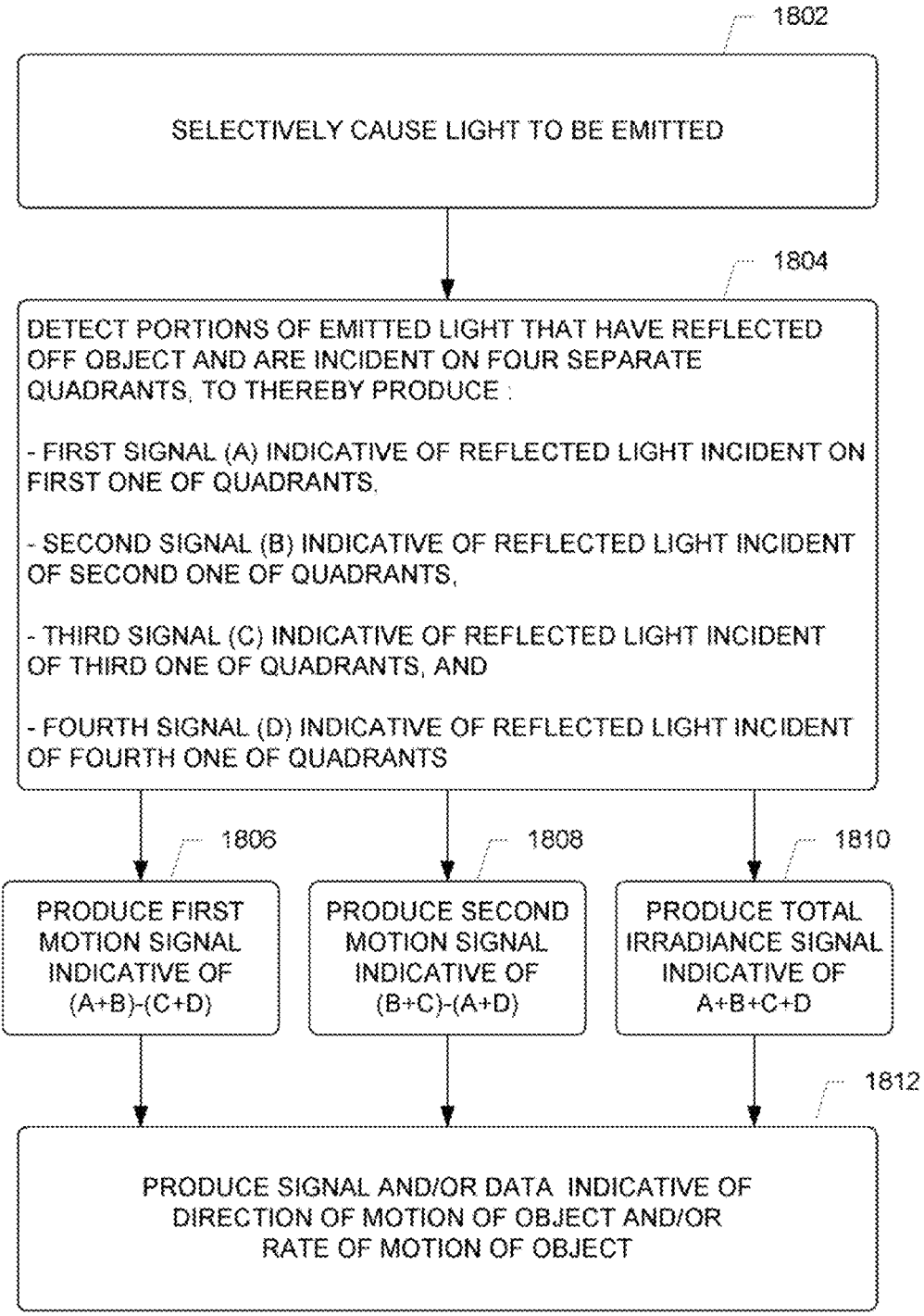
FIG. 18 is a high level flow diagram that is used to summarize methods according to various embodiments of the present invention.

FIG. 18 is a high level flow diagram that is used to summarize methods according to various embodiments of the present invention. Referring to FIG. 18, at step 1802, light is selectively emitted. At step 1804, portions of the emitted light are detected that have reflected off an object (also referred to as a target or target object) and are incident on four separate quadrants, or more specifically, on the four separate PD segments A, B, C and D. This enables four signals (A, B, C and D) to be produced, wherein each of the signals is indicative of the reflected light that is incident on a respective one of the quadrants. At step 1806, a first motion signal (also referred to as ΔX) is produced which is indicative of (A+B)−(C+D). At step 1808, a second motion signal (also referred to as ΔY) is produced which is indicative of (B+C)−(A+D). At step 1810, a total irradiance signal (also referred to as ΔE) is produced that is indicative of A+B+C+D. At step 1812, a signal and/or data that is indicative of a direction of motion and/or rate of motion of the object is produced, in dependence on the first and second motion signals, and optionally also the total irradiance signal. The total irradiance signal, as explained above, can be used to normalize the first and second motion signals. Additionally, the total irradiance signal can be used help distinguish between an active stroke motion and a retrace motion. Additional details of methods according to various embodiments of the present invention can be appreciated from the above discussion of FIGS. 1-17.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art.

Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. An optoelectronics apparatus for use with a single light source that is driven to selectively emit light, the optoelectronics apparatus comprising:

first, second, third and fourth electrically isolated photodetector (PD) segments, each of which is configured to detect light originating from the single light source that has reflected off an object and is incident on the PD segment, wherein the first PD segment is used to produce a first signal (A) indicative of the reflected light that is incident on the first PD segment, the second PD segment is used to produce a second signal (B) indicative of the reflected light incident on the second PD segment, the third PD segment is used to produce a third signal (C) indicative of the reflected light incident on the third PD segment, and the fourth PD segment is used to produce a fourth signal (D) indicative of the reflected light incident on the fourth PD segment;

circuitry configured to produce a first motion signal that is indicative of a sum of the first and second signals minus a sum of the third and fourth signals ((A+B)−(C+D));

circuitry configured to produce a second motion signal that is indicative of a sum of the second and third signals minus a sum of the first and fourth signals ((B+C)−(A+D));

circuitry configured to produce a total irradiance signal that is indicative of a sum of the first, second, third and fourth signals (A+B+C+D);

circuitry configured to produce, in dependence on the first and second motion signals, a signal and/or data that is indicative of a direction of motion of an object;

circuitry configured to produce, in dependence on the first and second motion signals, a signal and/or data that is indicative of a rate of motion of an object; and circuitry configured to distinguish between an active stroke motion of an object and a retrace motion of an object in dependence on the signal and/or data that is indicative of a rate of motion of an object and on the total irradiance signal.

2. The optoelectronics apparatus of claim 1, wherein the signal and/or data that is indicative of a direction of motion of an object enables each of the following different directions of motion to be distinguished from one another:
horizontal left-to-right motion;
horizontal right-to-left motion;
vertical up-to-down motion; and
vertical down-to-up motion.

3. The optoelectronics apparatus of claim 1, wherein the signal and/or data that is indicative of a direction of motion of an object is also indicative of an angle of motion of an object.

4. The optoelectronics apparatus of claim 1, wherein the circuitry configured to produce a signal and/or data that is indicative of a direction of motion of an object is configured to:
determine a polarity of a slope of a portion the first motion signal in order to determine whether a direction of motion is one of horizontal left-to-right motion and horizontal right-to-left motion; and/or
determine a polarity of a slope of a portion the second motion signal in order to determine whether a direction of motion is one of vertical up-to-down motion and vertical down-to-up motion.

5. The optoelectronics apparatus of claim 1, wherein:
the single light source is driven using a pulsed drive signal to thereby cause the single light source to emit light pulses; and
the circuitry configured to produce a signal and/or data that is indicative of a rate of motion of an object includes a counter that counts a number of pulses of reflected light that are detected during a motion cycle, wherein the number is inversely proportional to a rate of motion of an object.

6. The optoelectronics apparatus of claim 1,
wherein the total irradiance signal is used to normalize the first and second motion signals.

7. The optoelectronics apparatus of claim 1, further comprising:
circuitry configured to normalize the first and second motion signals in dependence on the total irradiance signal, prior to the first and second motion signals being used to produce a signal and/or data that is indicative of a direction of motion of an object.

8. The optoelectronics apparatus of claim 1, further comprising:
circuitry configured to compare the total irradiance signal to a predetermined threshold in order to produce a threshold comparison output signal;
wherein the threshold comparison output signal is either used to
(a) selectively disable at least a portion of the optoelectronic apparatus; or
(b) determine when not to use the produced signal and/or data that is indicative of a direction of motion of an object.

9. The optoelectronics apparatus of claim 1, further comprising:
a driver configured to selectively drive a single light source; and
wherein the first, second, third and fourth electrically isolated PD segments, the driver, the circuitry configured to produce the first motion signal, the circuitry configured to produce the second motion signal, and the circuitry configured to produce the signal and/or data that is indicative of a direction of motion of the object, are all included in a single integrated circuit (IC) package.

10. The optoelectronics apparatus of claim 1, wherein the first, second, third and fourth electrically isolated PD segments are arranged in a common plane in a two-by-two grid such that each of the PD segments has:
a first one of the other PD segments located horizontally to the right or left of the PD segment;
a second one of the other PD segments located vertically above or below the PD segment; and
a third one of the other PD segments located diagonal to the PD segment.

11. A method, comprising:
(a) selectively causing light to be emitted;
(b) detecting portions of the emitted light that have reflected off an object and are incident on four separate quadrants, to thereby produce
a first signal (A) indicative of the reflected light that is incident on a first one of the quadrants,
a second signal (B) indicative of the reflected light incident on a second one of the quadrants,
a third signal (C) indicative of the reflected light incident on a third one of the quadrants, and
a fourth signal (D) indicative of the reflected light incident on a fourth one of the quadrants;
(c) producing a first motion signal that is indicative of a sum of the first and second signals minus a sum of the third and fourth signals ((A+B)−(C+D));
(d) producing a second motion signal that is indicative of a sum of the second and third signals minus a sum of the first and fourth signals ((B+C)−(A+D));
(e) producing a total irradiance signal that is indicative of a sum of the first, second, third and fourth signals (A+B+C+D);
(f) producing, in dependence on the first and second motion signals, a signal and/or data that is indicative of a direction of motion of an object;
(g) producing, in dependence on the first and second motion signals, a signal and/or data that is indicative of a rate of motion of an object; and
(h) distinguishing between an active stroke motion of an object and a retrace motion of an object in dependence on the signal and/or data that is indicative of a rate of motion of an object and on the total irradiance signal.

12. The method of claim 11, further comprising:
normalizing the first and second motion signals using the total irradiance signal.

13. The method of claim 11, further comprising:
comparing the total irradiance signal to a predetermined threshold;
determining, based on results of the comparing, whether to either
(i) disable performance of one or more of steps (c), (d) and (f), or
(ii) not use the signal and/or data that is indicative of a direction of motion of an object produced at step (f).

14. A method, comprising:
detecting portions of emitted light that have reflected off an object and are incident on four separate photodetector (PD) segments;
producing a first signal (A) indicative of the reflected light that is incident on a first one of the PD segments;
producing a second signal (B) indicative of the reflected light incident on a second one of the PD segments;
producing a third signal (C) indicative of the reflected light that is incident on a third one of the PD segments;

producing a fourth signal (D) indicative of the reflected light incident on a fourth one of the PD segments;

detecting, in dependence on the first, second, third and fourth signals, a rate of motion of an object;

detecting, in dependence on the first, second, third and fourth signals, a total irradiance of the reflected light incident on the four PD segments; and distinguishing between an active stroke motion of an object and a retrace motion of an object in dependence on the rate of motion of an object and the total irradiance of the reflected light incident on the four PD segments.

15. The method of claim 14, further comprising:

detecting, in dependence on the first, second, third and fourth signals, a direction of motion of the object.

16. The method of claim 15, further comprising:

controlling a subsystem in dependence on the detected direction and/or rate of motion of the object.

17. A system, comprising:

a light source;

a driver configured to selectively drive the light source to thereby cause the light source to selectively emit light;

first, second, third and fourth electrically isolated photodetector (PD) segments, each of which is configured to detect light originating from the light source that has reflected off an object and is incident on the PD segment, wherein the first PD segment is used to produce a first signal (A) indicative of the reflected light that is incident on the first PD segment, the second PD segment is used to produce a second signal (B) indicative of the reflected light incident on the second PD segment, the third PD segment is used to produce a third signal (C) indicative of the reflected light incident on the third PD segment, and the fourth PD segment is used to produce a fourth signal (D) indicative of the reflected light incident on the fourth PD segment;

circuitry configured to detect, in dependence on the first, second, third and fourth signals, a rate of motion of an object;

circuitry configured to detect, in dependence on the first, second, third and fourth signals, a total irradiance of the reflected light incident on the four PD segments;

circuitry configured to distinguish between an active stroke motion of an object and a retrace motion of an object in dependence on the rate of motion of an object and the total irradiance of the reflected light incident on the four PD segments; and a subsystem that is controlled is dependence on the detected direction and/or rate of motion of an object.

18. An optoelectronics apparatus comprising:

a plurality of electrically isolated photodetector (PD) segments, each of which is configured to produce a respective signal indicate of light incident on and detected by the PD segment;

circuitry configured to detect, in dependence on the signals produced by the plurality of PD segments, a signal and/or data indicative of a rate of motion of an object;

circuitry configured to produce, in dependence on the signals produced by the plurality of PD segments, a signal indicative of a total irradiance of light incident on the plurality of PD segments; and circuitry configured to distinguish between an active stroke motion of an object and a retrace motion of an object in dependence on the signal and/or data indicative of a rate of motion of an object and on the signal indicative of a total irradiance of light incident on the plurality of PD segments.

19. The optoelectronics apparatus of claim 18, further comprising:

circuitry configured to detect, in dependence on the signals produced by the plurality of electrically isolated PD segments, a signal and/or data indicative of a direction of motion of an object.

20. The optoelectronics apparatus of claim 18, wherein the plurality of PD segments comprise four PD segments.

21. The optoelectronics apparatus of claim 18, further comprising a light source that is selectively driven to emit light.

22. A method for use with an optoelectronics apparatus that includes a plurality of electrically isolated photodetector (PD) segments, the method comprising:

(a) producing, using each of the PD segments, a respective signal indicate of light incident on and detected by the PD segment;

(b) detecting, in dependence on the signals produced by the plurality of PD segments, a signal and/or data indicative of a rate of motion of an object;

(c) producing, in dependence on the signals produced by the plurality of PD segments, a signal indicative of a total irradiance of light incident on and detected by the plurality of PD segments; and (d) distinguishing between an active stroke motion of an object and a retrace motion of an object in dependence on results of steps (b) and (c).

23. The method of claim 22, further comprising detecting, in dependence on the signals produced by the plurality of electrically isolated PD segments, a signal and/or data indicative of a direction of motion of an object.

* * * * *